Aug. 19, 1958   J. L. ANDREWS   2,848,171
DRIVE MECHANISM FOR FOOD WASTE DISPOSERS
Filed Dec. 30, 1952   2 Sheets-Sheet 1
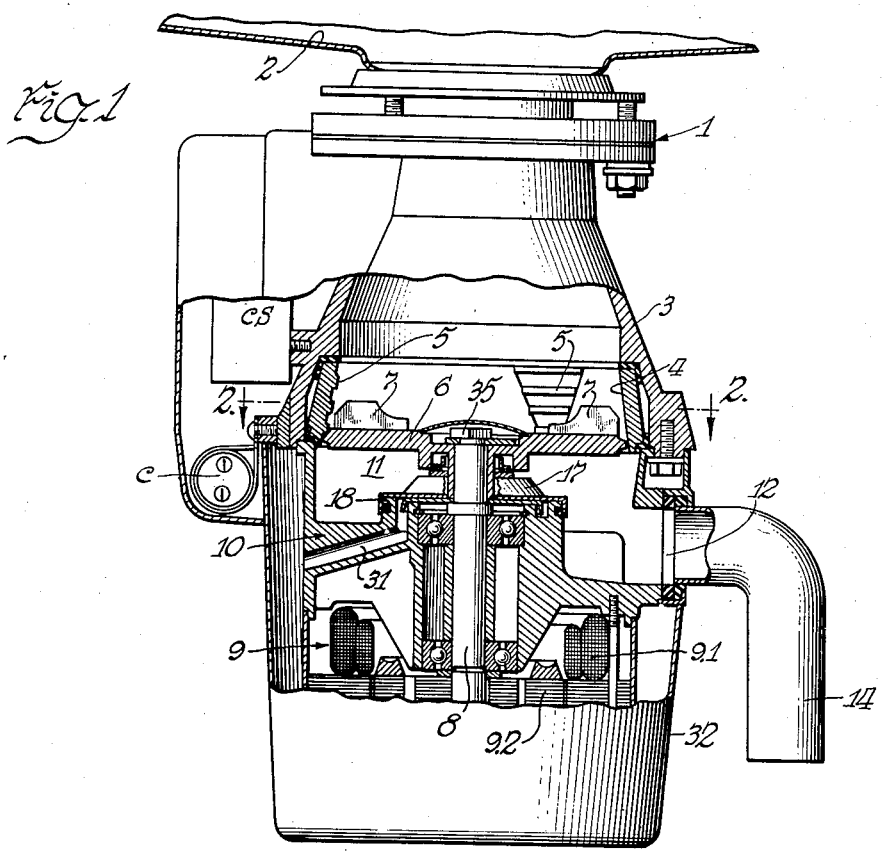
Inventor
John L. Andrews
By Andrew L. Hubbard
Atty.

Aug. 19, 1958  J. L. ANDREWS  2,848,171
DRIVE MECHANISM FOR FOOD WASTE DISPOSERS
Filed Dec. 30, 1952  2 Sheets-Sheet 2

Inventor
John L. Andrews
by Andrew G. Hubbard
Atty.

United States Patent Office 2,848,171
Patented Aug. 19, 1958

2,848,171

DRIVE MECHANISM FOR FOOD WASTE DISPOSERS

John L. Andrews, Oak Park, Ill., assignor to General Electric Company, a corporation of New York Application December 30, 1952, Serial No. 328,749

5 Claims. (Cl. 241—35)

This invention relates to food waste disposal apparatus and, in particular, to an improved drive means for the comminutor.

Food waste disposal units, of the type to which this invention is directed, have a food waste receiving chamber, at the bottom of which is a rotating device which causes the waste to be brought into contact with surfaces which reduce the waste to small particle size. Most desirably, the comminution is performed in the presence of water and the mixture of waste particles and water flows through appropriately arranged piping into the plumbing waste system of the building. In a presently popular type of apparatus, the chamber suspends from the bottom of a kitchen sink or the like, and the sink drainage opening forms the entrance to the chamber. The rotating member at the base of the chamber is in fact a flywheel arranged for rotation in a horizontal plane and is directly connected to the shaft of a motor suitably housed below a collection chamber through which the comminuted waste material and water discharges.

It sometimes happens that a long bone or corn cob will become arranged in the chamber in such fashion as to jam the flywheel sufficiently to stall the motor; or slivers of hard bone or other substances will jam between the impeller blades of the flywheel and the shredder elements and just as effectively stall the motor. It has been found that by reversing the direction of rotation of the flywheel, it is sometimes possible to break the jam, but often the offending object becomes so wedged that it prevents the motor from starting in either direction.

I have found that by making the flywheel rotatable relative to the motor shaft and by arranging a driving means which permits the motor to have an unloaded or "free" start, a food waste disposer may be constructed which will overcome almost any conceivable jamming condition.

It is therefore an object of my invention to provide an improved driving connection between the motor and the rotary comminution element of a food waste disposer.

It is a further object of the invention to provide a lost-motion drive connection between the rotary comminution element of a food waste disposer and the means for driving said element.

It is another object of the invention to provide a food waste disposal apparatus with a reversing motor and means whereby the motor upon reversal of rotation will have a free start before being subjected to substantial load.

It is still another object of the invention to provide a food waste disposal apparatus in which a jammed flywheel or other rotary comminution element may overcome the jamming condition by an impact-starting mechanism pursuant to which the kinetic energy in the rotor of a free-starting motor is applied to the comminution element.

In one presently preferred form, the foregoing objectives are fulfilled by mounting the rotatable comminuting element on the drive shaft for free rotation thereon, and providing said element with an axial pocket extending radially inward of which is a lug integral with, or affixed to, the comminuting element.

The end of the motor or other drive shaft extends into said pocket and non-rotatably carries a driving arm or arms arranged to be rotated by the shaft in the plane of said lug. The driving arm and lug are so related that the drive shaft may have a free rotation of substantial angular extent—for example, 120° or more—before the drive arm engages the lug to enforce the rotation of the comminuting element.

A jammed condition resulting in a motor stall will, of course, leave the drive arm against the flywheel lug. In the reversing-motor types, when the motor is re-started in a reverse direction, the driving arm will have substantial movement before engaging the other face of the lug to urge the flywheel into rotation.

Many waste-food disposer types use one-direction motors, and I have therefore provided means including a retractable driving arm which will withdraw from the flywheel lug as the motor is de-energized in preparation for a new start. Centrifugally responsive means are provided to extend the driving arm into operation position following a free rotation thereof.

I consider it desirable to restrain the flywheel from running materially ahead of the driving arm when the motor is stopped following an uneventful operation. In this way, an impact start is assured for every operation of the disposer regardless of whether the drive motor is of the reversible or one-direction type.

Other features and advantages of the invention will be apparent from the following detailed descriptions of presently preferred embodiments, read in connection with the accompanying drawings in which:

Fig. 1 is a side elevation, partly in section, showing an installation of a typical food waste disposer embodying the invention;

Fig. 2 is a fragmentary plan view of the rotatable comminution element and driving means therefor, taken generally in the direction of the arrows 2—2 of Fig. 1, but eliminating the fixed comminutor and other elements;

Figure 3:
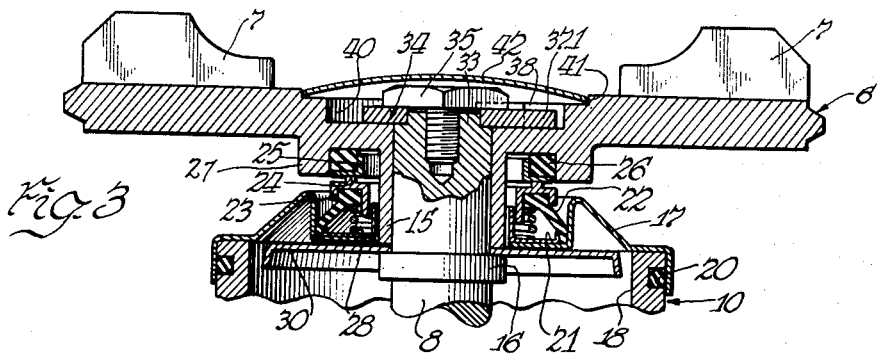
Fig. 3 is a side sectional elevation of the comminution element and shaft sealing means taken along lines 3—3 of Fig. 2.

Fig. 1 shows a typical domestic kitchen type of waste disposal apparatus, which by means of a mounting flange assembly 1 is suspended from the basin of a kitchen sink 2 about the drainage opening thereof. The flange assembly provides an entrance into the comminution chamber 3. Said entrance forms the passage through which the waste material is loaded into the chamber. A manually operable, removable closure element (not shown) is used to close off the passage to everything but flow of water into the chamber while the disposer is operating.

In the type illustrated, there is resiliently mounted at the base of the chamber, a fixed comminution element 4, having a suitable plurality of cutting and abrading devices 5 disposed in spaced relation about said fixed element. The fixed element is advantageously a ring-like structure of hardened metal. Cooperating with said fixed element 4 is a rotatable comminutor 6 having two or more radially arranged impeller blades 7 which operate in rather close proximity to the abrading devices 5. The comminutor 6 is, in the illustrated form, a form of flywheel carried on the end of a drive shaft 8 which comprises an integral extension of the shaft of a motor 9, suitably mounted below a housing and bearing structure 10. The motor has a conventional stator 9.1 and rotor 9.2. Said housing structure has an annular chamber 11 below the flywheel and the mixture of comminuted waste and water enters the chamber 11 through variously disposed apertures (not shown) formed in the lower wall portion of the comminutor ring 4. The mixture then passes through the discharge opening 12 and tail piece 14 to a conventional plumbing waste trap (not shown) of the plumbing waste system of the building.

Figure 8:
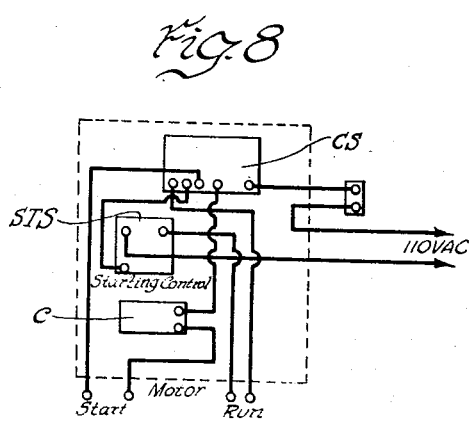
Fig. 8 is a typical wiring diagram for a waste disposer of the reversing motor type.

There are certain control switches which have become almost standard in the art. It is advantageous to comminute the food waste in the presence of cold water, and a flow responsive switch (see FS Fig. 8) may be installed in the cold water line serving the faucet (not shown) of the sink 2. Such a switch and its method of installation and operation are shown in Powers U. S. Patent 2,244,402, granted June 3, 1941 for "Waste Disposal Apparatus". The closure member (not shown) of the disposer may be of the type which operates a switch CS (Fig. 8) when the closure is in a locked-in home position. Said closure and associated switch may be of the type shown in Powers U. S. Patent No. 2,185,037, granted December 26, 1939, for "Waste Disposal Apparatus," or the type shown in the presently pending application of Thomas H. Swisher, Serial No. 229,215, filed May 31, 1951, for "Kitchen Waste Disposal Apparatus," now Patent 2,669,395, granted February 16, 1954, for "Kitchen Waste Disposal Apparatus With Reversing Means," and assigned to the assignee herein. In the disclosure of Powers 2,185,037, the motor is of the one-direction type, whereas in the Swisher disclosure, the motor is reversible and may be run in one or the other direction at the option of the operator. It will be assumed that the apparatus of Figs. 1 and 2 herein utilize the Swisher type. Accordingly, the wiring diagram of Fig. 8 is appropriate. It is to be understood, however, that the motor control switch need not necessarily be of either of the above mentioned types, nor in fact operated by the closure. Hammes, U. S. Patent 2,225,171, granted December 17, 1940, for example, shows a reversing motor disposer having a manually operated externally mounted switch; and various other switch arrangements are known in the art.

Briefly, the operation of the apparatus is as follows:

Food waste scraps are placed in the chamber 3, the closure moved to "operate" position (thereby closing the switch CS) and the cold water turned on. When a predetermined rate of water flow is attained, the flow switch FS closes completing the circuit to the motor. As shown, the motor circuit has a starting capacitor C, but for reasons later appearing, the employment of the instant invention may eliminate the need for capacitor-start motors. With a conventional starting control switch STS, Fig. 8, the start-winding of the motor field coil is first energized and subsequently automatically cut out in favor of the run winding.

The rapidly rotating comminutor 6 is effective through its impeller blades 7 to whirl the food waste about the chamber in contact with the cutting devices 5. By these devices plus the shearing, cutting and macerating effect of the impeller blades themselves and other cutting surfaces (not shown) disposed about the stationary comminutor ring, the food waste is reduced to small particle size and the mixture of food waste and cold water flows into the chamber 11 from which it passes to the plumbing waste system of the building.

It frequently happens that a corn cob or long bone will become jammed between the side of an impeller blade 7 and the wall of the comminution chamber, or bone slivers or slender foreign bodies become jammed between an impeller and the side edges of one of the cutting devices 5. The resulting jam will frequently stall the motor, which must be promptly disconnected from power (for example, by shutting off the cold water flow which causes the switch FS to return to open circuit status). In conventional one-direction machines, it is sometimes necessary to remove the closure and reach into the chamber to try to remove or rearrange the corn cob or long bone, or to use a sort of wrench or tool to break the jammed condition when it results from an obstruction between the impeller and the cutting element. In the reversing motor types of machine, the jam can frequently be cleared by energizing the motor in reverse direction, but there nevertheless are situations where the jam is so tight that it is impossible to start the motor in either forward or reverse direction.

I have found that almost every jamming condition can be cleared and the apparatus returned to normal operation by what I term "impact starting" of the comminutor. As presently appears, I provide for a free rotation of the motor rotor before the load is applied thereto, thereby utilizing the kinetic energy of the rotor to assist in breaking the rotating comminuting element away from the foreign object which may be causing the jam. In one form, the invention resides in mounting the flywheel or other rotatable comminuting element on the drive shaft for free rotation with respect thereto, and providing drive means on the shaft which engage the flywheel to urge it into rotation after the motor has had a substantially unloaded start. The free start of the motor is the aspect of the invention which appears to make it unnecessary to use the relatively expensive capacitor-start motor types.

In the embodiment of Figs. 2 and 3, the comminutor element 6 is formed with a bearing sleeve or collar 15 accommodating the end of the drive shaft 8. A shoulder 16 supports the comminutor on the shaft. To prevent water from the chamber 11 from passing along the shaft 8 and into the motor windings, I employ a conventional shaft seal. For example, a cap 17 is snugly carried on a neck 18 of housing 10 and is in liquid tight relation therewith by reason of the gasket 20. Said cap carries an angular ring 21 between an outer flange of which and a wall of the cap is confined the bottom edge of a flexible water-impervious frusto-conical element 22. The thickened upper portion of said element 22 carries the stationary sealing element 23 of which an annular bead 24 is in rotatable surface contact with the base of a complementary sealing element 25, secured to a resilient ring 26 frictionally engaging the walls of a cavity having the peripheral rim portion 27. A spring 28 urges the sealing element 24 into engagement with element 25. To handle any water which may leak along the inner wall of sleeve 15, I use a conventional water slinger disc 30, which rotates at shaft speed and is therefore effective to throw the water into a housing channel communicating with a drainage passage 31. The very small quantities of water which may be ejected into said passage, drip into the space defined by the outer casing 32 (Fig. 1). Said casing is normally perforated at the bottom to provide for ventilating the motor compartment and the water will either drip through the bottom openings or be evaporated within the casing by the combination of the heat generated within the motor and the air circulation thereabout.

The upper end of shaft 8 has flats formed therein to provide a non-circular mounting portion 33 on which is placed the driving means 34. A screw 35 axially entering the shaft 8 secures the driving means in position. In the illustrated embodiment, the driving means has two drive arms 37, 37.1, extending radially with respect to the shaft at approximately 120° angular displacement. According to the direction of rotation of the shaft, one or the other of the drive arms will engage a side wall of a lug or abutment 38 which is attached to the comminutor 6. When the comminutor is a cast metal part, as indicated, it is advantageous to provide a cavity or pocket 40 within which the drive means operates and to form the lug 38 as an integral extension from the wall bounding the cavity. The cavity is preferably provided with an outer shoulder 41 against which seats a plate or cap 42 providing a removable closure for the pocket. The cap 42 prevents waste material from entering the pocket and also serves as a retainer to prevent the escape of grease or other lubricant which may be placed in the pocket at the time of manufacture.

If we assume that the drive shaft 8 and the comminutor 6 have stopped in the Fig. 2 position following a counter clockwise rotation, either resulting from uneventful operation or a stalled motor condition, it will be obvious that if the motor is then energized to drive the shaft in clockwise direction, the rotor of the motor will have a relatively free rotation of about 120° before the arm 37 strikes the lug 38. The impact of the arm 37 against the lug will overcome all but the severe jam situations, and the comminutor 6 will begin to rotate in the clockwise direction. If the jam is so severe that the comminutor resists rotation after the first impact of the driving arm against the lug 38, one or two additional reversals will cause the arms 37 and 37.1 successively to strike the lug until the obstruction is eventually cleared and normal operation resumed.

The two-arm arrangement of driving means is by way of illustration only. Obviously, a single-arm driving means may be employed and the width of the driving arm thereof may be appropriately related to the width of the lug 38 to produce the desired amount of rotation of the driving arm prior to impact.

It will be apparent, of course, that the "impact start" of the comminutor is essentially the result of the momentum of the motor rotor 9.2, because the motor shaft and the driving means 34 have relatively low mass and moment of inertia. It therefore follows that impact starting, in the reversing type of disposer particularly, may be accomplished by mounting the motor rotor for a limited amount of free rotation on its shaft. With such an arrangement, the comminutor 6 may be fixed to the end of the shaft, as in presently-known disposers, or to extend the amount of free rotation of the rotor, the comminutor arrangement and driving means of Figs. 1 and 2 may be employed in addition to the above discussed rotor mounting. This would produce an initial free rotation of the rotor on its shaft and a further rotation of the shaft and driving means before engagement of the drive lug on the comminutor.

Figure 4:
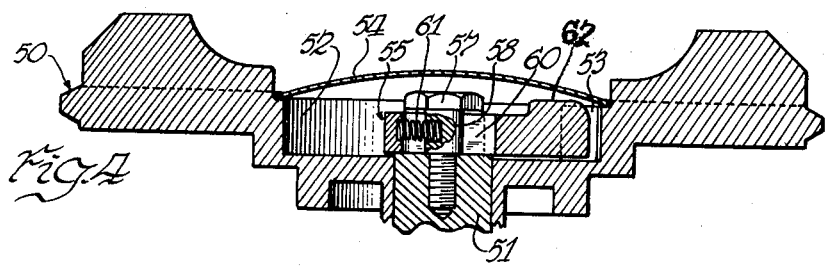
Figs. 4 and 5 are respectively a side sectional elevation and a fragmentary plan view of a second embodiment of the driving means.
Figure 5:
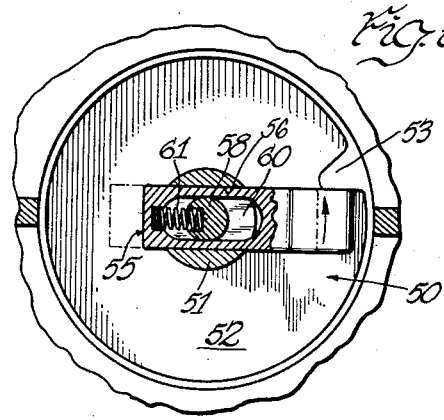

Figs. 4 and 5 show an impact drive device arranged for disposers having one-direction motors. The rotating comminutor 50 is arranged for free rotation on drive shaft 51, and it will be assumed that suitable shaft-sealing means are provided as previously described. The cavity 52 is somewhat larger in diameter than the cavity 40 of Fig. 2. The abutment 53 serves the previously described function. Cap 54 provides a removable closure.

The driving means comprises a single arm member 55 which seats slidably in a slot 56 formed in the drive shaft. The arm member is restrained within the slot by a shouldered screw or equivalent 57 having the cylindrical portion 58 passing through the slot 60 provided in arm 55. The arm is thus guided for radial movement within the shaft slot by the screw portion 58 and the shaft walls defining the slot. A light coil spring 61 suitably confined between the screw portion and the end of the slot urges the driving arm to the left of Figs. 4 and 5; the length of the slot is such that when the shaft is not in rotation, the spring will move the driving arm to the position shown in the broken lines, in which the driving end of the arm is radially inward of the lug 53. Preferably, the driving end of the arm is enlarged as indicated at 62 to place the center of mass of the arm outward of the shaft 51 when the arm is in its retracted position.

With the shaft 51 at rest and with no load on the motor, spring 61 will position the driving arm in non-driving position with respect to lug 53. When the motor is energized, centrifugal forces acting on the arm will drive it outwardly during the first revolution of the shaft and bring the end 62 of the arm into driving position. The comminutor 50 will be urged into rotation by the impact of the driving arm against the lug 53. The driving relation of the driving arm and lug will be maintained by the continuing centrifugal force on the arm.

If the comminutor stops because of a jam condition, the operator will usually turn off the water at the sink faucet and remove the closure to look into the chamber to see if a long bone or the like is the offending object. This will automatically break the motor circuit as described in the above noted Powers patents. With the motor de-energized, the driving arm is no longer being held against the lug 53 and the light spring is capable of withdrawing the arm from the lug. When the motor circuit is reclosed, the initial free rotation of the shaft will again produce the centrifugal forces necessary to bring the arm into driving position and the comminutor will be sharply struck. One or more of such operations may suffice to break the jam.

Figure 6:
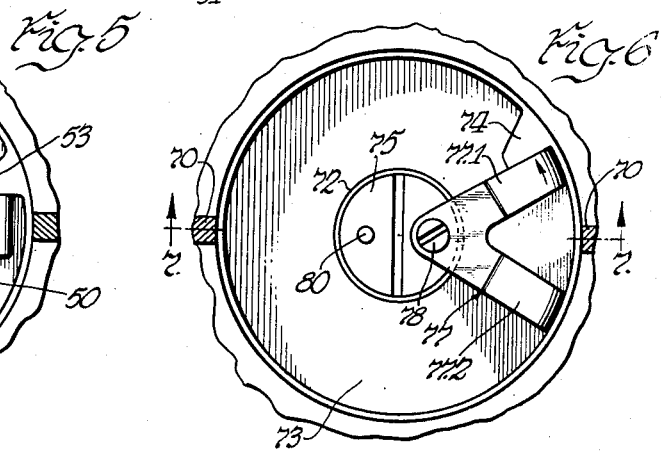
Figs. 6 and 7 are respectively a fragmentary plan view and a side sectional elevation of another embodiment of the invention, the sectional elevation being taken on lines 7—7 of Fig. 6.
Figure 7:
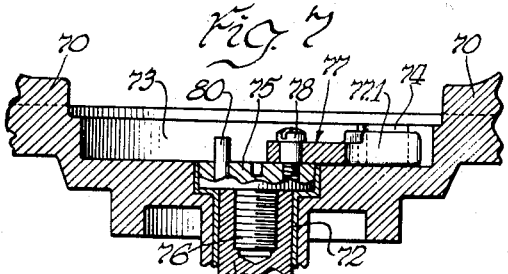

The impact drive arrangement of Figs. 6 and 7 is adaptable to either one direction or reversing motor disposers. The comminutor 70 is mounted for free rotation on shaft 71, and I have shown a sleeve bearing 72 between the hub of the rotor and the shaft. Such a bearing may, of course, be used in any of the foregoing embodiments. The comminutor is provided with a cavity 73 from the wall of which extends the lug 74. Disposed within a central depression of the cavity is the head 75 of a securement screw 76 threaded into the shaft 71. The screw prevents removal of the comminutor while permitting free rotation thereof on the shaft. The driving means 77 is essentially a V-shaped device. A pivot pin 78 passes into the head of the screw through the apex of the driving means, and it will be noted that the pivot is eccentric with respect to the axis of the shaft. The drive arms 77.1 and 77.2 have weighted drive ends and are sufficiently long to engage the side wall of the lug 74 over substantially its full length. A stop pin 80 will prevent mere oscillation of the driving means about its pivot.

When the shaft starts in counterclockwise direction from the rest position of Fig. 6, the driving means will initially rotate counterclockwise with respect to the shaft and comminutor, because at the instant of starting centrifugal forces acting on the driving means will be low. Arm 77.1 will cam past the lug 74, and it is probable that arm 77.2 will also, although the latter arm will react outwardly and strike the lug 74 sharply in the process. This initial impact serves to overcome the initial inertia of the comminutor. When arm 77.1 again comes against the lug 74, centrifugal forces will overcome any tendency to clockwise rotation of the driving means and the arm will therefore become a rigid driving element. Centrifugal forces acting on arm 77.2 contribute to the driving effect of the arm 77.1, because it will be recognized that the forces are trying to rotate the entire driving means to a position in which arm 77.2 becomes more nearly radial with respect to the axis of the drive shaft. If the shaft and driving means could rotate freely—that is if the lug 74 were eliminated—the driving means would assume a position in which a line bisecting the base angle thereof would be radial with respect to the drive shaft.

If the comminutor should stall, the shaft will continue to rotate and will snap the drive arms past the lug 74. There will thus be a succession of sharp impulses against the comminutor as each drive arm comes into play. It is likely that the cumulative effect of the blows will break the jam. In a reversing machine, the operator may stop the motor and restart it in the opposite direction, and experience has shown that the jam condition will usually clear upon impact-starting of the comminutor in the new direction.

The drive means of the several embodiments should, of course, be of high strength material having adequate wear and impact resisting properties. A typical material, for example, is tempered and hardened steel. The comminutor drive lugs may, if desired, comprise studs or pins of similar material suitably set into the body of the comminutor.

It is preferable to prevent the comminutor from running ahead of the drive means when the machine is shut off after a normal run. In the reversing type, for example, if the comminutor ran ahead of the drive arm at the end of an operation, the drive lug on the comminutor might approach, or even come to rest against, the drive arm which is to become effective at the next operation. The value of the impact-start would be reduced if the drive arm and lug were in close proximity and, of course, would disappear entirely if the lug had come to rest against the drive arm. The shaft sealing arrangement may be employed to apply a small restraining force against the comminutor by making spring 28 sufficiently stiff to hold the sealing element 24 snugly against the companion sealing piece 25. This light frictional engagement, plus the resistance to rotation offered by a continuing inflow of water into the chamber and the effort of the comminutor to pump the liquid into the discharge pipe, will prevent the comminutor from running ahead of the driving means following the opening of the motor circuit after a normal comminution operation.

It will, of course, be understood that suitable counterbalance means (not shown) will be provided to offset the unbalance produced in the drive shaft by the various driving elements carried thereby.

While I have shown a particular embodiment of my invention, it will be understood, of course, that I do not wish to be limited thereto since many modifications may be made; and I therefore contemplate by the appended claims to cover any such modifications as fall within the true spirit and scope of my invention.

I claim:

1. Waste disposal apparatus, comprising a chamber to receive waste material, comminution means including a rotatable comminution element within said chamber and on which is received material for comminution, said comminution element having side and base wall means defining a shallow circular cavity facing said chamber coaxial with the axis of rotation of said element, a lug extending radially from the side wall of said cavity, the circumferential dimension of said lug being a relatively small fraction of the circumference of said cavity, an electric motor, a shaft driven by said motor and extending into said cavity coaxial therewith, means for mounting said element on said drive shaft for rotation relative thereto, a drive arm rigidly fixed to said shaft within the said chamber and extending into side-by-side relation with said lug for engaging the same to drive the comminution element only after a period of substantially free rotation of said shaft in at least one direction of rotation thereof, whereby substantial kinetic energy developed by said motor during said period of free rotation is applied suddenly to said comminution element, and a cover for said cavity, said cover providing a low, smooth, center area for said comminution element.

2. Waste disposal apparatus as in claim 1. in which said motor is optionally reversible and the drive arm is effective to provide the said substantially free rotation of the motor on the latter being reversed from the preceding direction of operation.

3. Waste disposal apparatus, comprising a chamber to receive waste material, comminution means including a rotatable comminution element within said chamber, said comminution element having a substantially flat disk-like top facing said chamber, an electric motor for driving said element, a control circuit for said motor, and drive means between said motor and said comminution element, including a shaft driven by said motor, means for mounting said element on said shaft for free rotation thereon, a lug integral with said comminution element and disposed in said flat top portion of said element radially outward of said shaft, and a drive arm on said shaft arranged to engage said lug to drive said comminution element only following an initial substantially free rotation of said shaft with respect to said comminution element on said shaft being reversed in direction of rotation from the preceding operation.

4. Waste disposal apparatus, comprising a chamber to receive waste material, an electric drive motor, an electric circuit effective to operate said motor in a desired direction, a shaft driven by said motor, a disk-like comminution element rotatably mounted on said drive shaft, said comminution element forming the base of said chamber, said comminution element having side and base wall means forming a cavity coaxial with said shaft, rigid wall means fixed to said comminution element within said cavity, said wall means extending toward the center of said cavity, the circumferential dimension of said fixed rigid wall means being only a relatively small fraction of the circumference of said cavity, and rigid drive means fixed on said shaft and extending into overlapping relation with said rigid wall means to engage a side thereof after an interval of free rotation of said drive shaft in a desired direction, whereby kinetic energy generated during said interval of free rotation may be utilized to urge the comminution element into rotation.

5. Waste disposal apparatus, comprising a chamber to receive waste material, an electric drive motor, an electric circuit effective to operate said drive motor in a forward or reverse direction, a shaft driven by said motor, a disk-like comminution element rotatably mounted on said shaft, side and base wall means on said comminution element forming a cylindrical cavity coaxial with said shaft, rigid wall means fixed to said comminution element within said cavity and adjacent the side wall thereof, said wall means extending toward the center of said cavity, the circumferential dimension of said fixed rigid wall means being only a relatively small fraction of the circumference of said cavity, a first rigid drive arm fixed to said shaft and extending into overlapping relation with said rigid wall means to engage a side thereof after an interval of free rotation of said shaft in one direction, and a second rigid drive arm fixed to said shaft and extending into overlapping relation with said rigid wall means to engage the opposite side wall thereof after an interval of free rotation of said shaft in the opposite direction.

References Cited in the file of this patent

UNITED STATES PATENTS

| Number | Name | Date |
|---|---|---|
| 993,570 | Webster | May 30, 1911 |
| 1,606,964 | Sexauer | Nov. 16, 1926 |
| 1,756,689 | Jenkins | Apr. 29, 1930 |
| 1,956,417 | Else | Apr. 24, 1934 |
| 2,057,371 | Dickson | Oct. 13, 1936 |
| 2,099,359 | Woodeson et al. | Nov. 16, 1937 |
| 2,156,075 | Alexay | Apr. 25, 1939 |
| 2,225,171 | Hammes | Dec. 17, 1940 |
| 2,282,883 | Powers | May 12, 1942 |
| 2,442,812 | Jordan | June 8, 1948 |
| 2,573,213 | Miller | Oct. 30, 1951 |
| 2,678,775 | Simmons | May 18, 1954 |

FOREIGN PATENTS

| Number | Country | Date |
|---|---|---|
| 406,934 | Germany | Dec. 4, 1924 |
| 532,677 | Germany | Sept. 2, 1931 |
| 823,758 | Germany | Dec. 6, 1951 |
| 954,341 | France | June 6, 1949 |